US012737799B2

(12) United States Patent
Suzuki et al.

(10) Patent No.: US 12,737,799 B2
(45) Date of Patent: Sep. 15, 2026

(54) INFORMATION OUTPUT METHOD, INFORMATION OUTPUT APPARATUS, AND NON-TRANSITORY COMPUTER READABLE STORAGE MEDIUM

(71) Applicant: Panasonic Intellectual Property Corporation of America, Torrance, CA (US)

(72) Inventors: Taro Suzuki, Ibaraki (JP); Kazunobu Konishi, Osaka (JP); Masafumi Ishikawa, Tokyo (JP); Hiroko Izumi, Kanagawa (JP); Yuki Takaoka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 251 days.

(21) Appl. No.: 18/610,525

(22) Filed: Mar. 20, 2024

(65) Prior Publication Data

US 2024/0221058 A1 Jul. 4, 2024

Related U.S. Application Data

(63) Continuation of application No. PCT/JP2022/024594, filed on Jun. 20, 2022.

(30) Foreign Application Priority Data

Sep. 29, 2021 (JP) ................................ 2021-159913

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS

2011/0251807 A1* 10/2011 Rada ........................ G01D 4/00 702/61
2014/0195297 A1* 7/2014 Abuelsaad ......... G06Q 10/0635 705/7.28

(Continued)

FOREIGN PATENT DOCUMENTS

JP 2003-303244 10/2003
JP 2006-277750 10/2006

(Continued)

OTHER PUBLICATIONS

IBM, "System and Method of Energy Conservation via Device Monitoring and Intelligent Presentation of Upgrade and Replacement Options", IP.com Prior Art Database Technical Disclosure, IPCOM000184904D, Jul. 4, 2009 (Year: 2009).*

(Continued)

*Primary Examiner* — Ethan D Civan
(74) *Attorney, Agent, or Firm* — Wenderoth, Lind & Ponack, L.L.P.

(57) ABSTRACT

An information output method includes: acquiring, by a processor, first information on a first device installed in a facility employed by a user; acquiring, by the processor, second information on a plurality of second devices installed outside the facility; determining, by the processor, based on the first information and the second information, at least one recommendation device to replace the first device among the plurality of second devices; and outputting, by the processor, recommendation information concerning recommendation of the at least one recommendation device to the user.

20 Claims, 8 Drawing Sheets

(56) References Cited

U.S. PATENT DOCUMENTS

| | | | | |
|---|---|---|---|---|
| 2016/0127144 | A1 | 5/2016 | Takahashi et al. | |
| 2016/0373321 | A1* | 12/2016 | Plaza | H04L 41/0631 |
| 2017/0235290 | A1* | 8/2017 | Weber | H02J 13/1323 700/276 |
| 2017/0280459 | A1* | 9/2017 | Ogrinz | H04W 24/08 |
| 2019/0370717 | A1* | 12/2019 | Diaz | G06F 3/1292 |

FOREIGN PATENT DOCUMENTS

| | | |
|---|---|---|
| JP | 2014-132506 | 7/2014 |
| JP | 2015-28760 | 2/2015 |
| JP | 2015-191449 | 11/2015 |
| JP | 2021-76714 | 5/2021 |

OTHER PUBLICATIONS

International Search Report issued Sep. 20, 2022 in International (PCT) Application No. PCT/JP2022/024594.

* cited by examiner 1
10
50
90
COMMUNICATION NETWORK
43
LOG DATABASE
2
21
SENSOR
20
DEVICE
30
41
FIRST DATABASE
42
SECOND DATABASE 42
421
FACILITY ID
DEVICE ID
MODEL NUMBER
INSTALLATION POSITION
USAGE PERIOD
PURCHASE PRICE
INSTALLATION PRICE
422
MODEL NUMBER
MANUFACTURING DATE
GROUP OF FUNCTIONS
LONGEVITY
423
MODEL NUMBER
GROUP OF DISTINCTIVE FUNCTIONS
424
MODEL NUMBER
ATTRIBUTE
GROUP OF USEFUL FUNCTIONS
425
MODEL NUMBER
RELEVANT PRODUCT ID
URL 10
SERVER
100
PROCESSOR
101
FIRST ACQUISITION PART
102
SECOND ACQUISITION PART
103
DETERMINATION PART
104
OUTPUT PART
105
MANAGEMENT PART
106
SALES PROMOTION PART
110
MEMORY
120
COMMUNICATION CIRCUIT

INFORMATION OUTPUT METHOD, INFORMATION OUTPUT APPARATUS, AND NON-TRANSITORY COMPUTER READABLE STORAGE MEDIUM

FIELD OF INVENTION

The present disclosure relates to a technique of recommending a device to a user.

BACKGROUND ART

There has been conventionally known a technique of notifying information on surroundings of a current position of a user to a terminal used by the user. For example, Japanese Unexamined Patent Publication No. 2021-76714 (hereinafter, "JP 2021-76714") discloses extracting pieces of information on surroundings of a position of a terminal device and generating display data that causes the terminal device to display the pieces of information on the surroundings of the position of the terminal device.

However, in JP 2021-76714, no consideration can be seen to select a group of available devices outside on the basis of a device used by a user and provide information concerning recommendation of the group of devices. Therefore, there is a problem that a group of devices which may replace a device installed in a facility employed by a user and are installed outside the facility cannot be recommended.

SUMMARY OF THE INVENTION

The present disclosure has been made to solve the above-mentioned problems, and an object thereof is to provide an information output method, an information output apparatus, and a non-transitory computer readable storage medium that enable recommendation of a group of devices which may replace a device installed in a facility employed by a user and are installed outside the facility.

An information output method according to an aspect of the present disclosure, by a computer, includes: acquiring first information on a first device installed in a facility employed by a user; acquiring second information on a plurality of second devices installed outside the facility; determining, on the basis of the first information and the second information, one or more recommendation devices to replace the first device among the second devices; and outputting recommendation information concerning recommendation of the one or more recommendation devices to the user.

DETAILED DESCRIPTION

Figure 1:
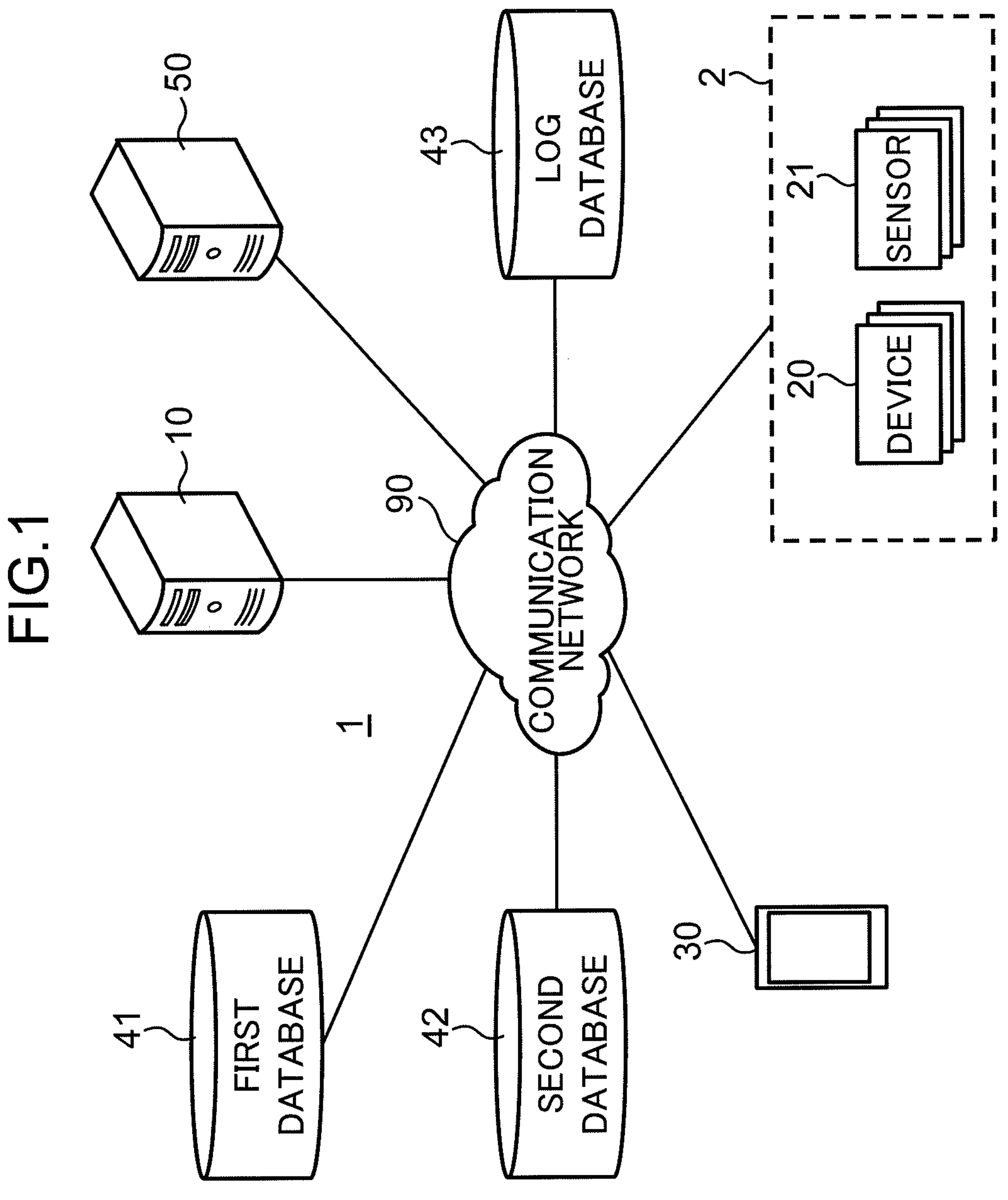
FIG. 1 is a diagram showing an exemplary general structure of a device recommendation system according to an embodiment of the present disclosure.

As described above, there has been conventionally known a technique of notifying information on surroundings of a current position of a user to a terminal used by the user. For example, JP 2021-76714 discloses extracting pieces of information on surroundings of a position of a terminal device and generating display data that causes the terminal device to display the pieces of information on the surroundings of the position of the terminal device.

However, in JP 2021-76714, no consideration can be seen to select a group of available devices outside on the basis of a device used by a user and provide information concerning recommendation of the group of devices. Therefore, the technique of JP 2021-76714 may enable displaying information on a group of devices installed in a facility around a facility employed by the user, but involves difficulties in recommendation of devices to replace a device installed in the facility employed by the user among the group of devices.

Particularly, a device that is hard to install for the user by him/herself and has a long durable life, e.g., a toilet or a bathtub, tends to be used for a long time; this makes it difficult to attract interest of a user in a new product. If recommendation of a new product which may replace such a device and is installed outside a facility employed by the user is achieved, it is hopeful that the user tries to use the new product to get interested in the replacement of the device.

Therefore, the present inventors have made eager studies on the technique of recommending a group of devices which may replace a device installed in a facility employed by a user and are installed outside the facility to the user, thus achieving each configuration of the present disclosure described below.

The information output method according to an aspect of the present disclosure, by a computer, includes: acquiring first information on a first device installed in a facility employed by a user; acquiring second information on a plurality of second devices installed outside the facility; determining, on the basis of the first information and the second information, one or more recommendation devices to replace the first device among the second devices; and outputting recommendation information concerning recommendation of the one or more recommendation devices to the user.

In this configuration, one or more recommendation devices to replace the first device can be appropriately determined among the second devices on the basis of the first information on the first device installed in the facility employed by the user and the second information on the second devices installed outside the facility. Further, recommendation information concerning recommendation of the one or more recommendation devices to the user is output and the user refers to the recommendation information; thus, the recommendation of the one or more recommendation devices installed outside the facility can be achieved.

In the information output method, the first information may include a manufacturing date, a usage period, and a longevity of the first device, the second information may include the manufacturing date of each of the second devices, and in the determination of the one or more recommendation devices, in a case that a ratio of the usage period of the first device to the longevity of the first device is larger than a predetermined ratio, one or more second devices with a manufacturing date newer than the manufacturing date of the first device may be determined among the second devices as the one or more recommendation devices.

In this configuration, in a case that a ratio of the usage period of the first device to the longevity of the first device is larger than a predetermined ratio, recommendation information concerning recommendation of one or more second devices with a manufacturing date newer than the manufacturing date of the first device is output. Thus, a device newer than the first device can be recommended to the user among the devices installed outside the facility employed by the user in a case that the longevity of the first device is close to the end.

In the information output method, the first information may concern a group of functions which the first device has, the second information may concern a group of functions which each of the second devices has, and in the determination of the one or more recommendation devices, one or more second devices having a function that the first device does not have may be determined among the second devices as the one or more recommendation devices.

In this configuration, recommendation information concerning recommendation of one or more second devices having a function that the first device does not have is output. Thus, a device having a function that the first device does not have can be recommended to the user among the devices installed outside the facility employed by the user.

In the information output method, the first information may concern a group of functions which the first device has, the second information may concern a group of functions which each of the second devices has and one or more distinctive functions which each of the second devices has, and in the determination of the one or more recommendation devices, one or more second devices having a function that is included in the one or more distinctive functions and that the first device does not have may be determined among the second devices as the one or more recommendation devices.

In this configuration, recommendation information concerning recommendation of one or more second devices having a distinctive function that the first device does not have is output. Thus, a device having a distinctive function that the first device does not have can be recommended to the user among the devices installed outside the facility employed by the user.

In the information output method, the first information may concern a group of functions which the first device has, and an attribute of each of one or more users that employs the facility, the second information may concern a group of functions which each of the second devices has, and a group of useful functions which each of the second devices has and are useful for an attribute of each of the one or more users, and in the determination of the one or more recommendation devices, at least one second device having a function that is included in the group of useful functions useful for the attribute of each of the one or more users may be determined among the one or more second devices as the one or more recommendation devices.

In this configuration, recommendation information concerning recommendation of at least one second device having a useful function for the attribute of each of the one or more users that employs the facility employed by the user among the one or more second devices having a function that the first device does not have is output. This enables recommendation to the user under a limitation of the one or more second devices having a function that the first device does not have to at least one second device having a useful function for the attribute of each of the one or more users.

In the information output method, in the determination of the one or more recommendation devices, information indicative of a rule that is set on the basis of the first information and the second information may be acquired, and the one or more recommendation devices may be determined among the second devices according to the rule.

In this configuration, recommendation information concerning recommendation of one or more recommendation devices determined among the second devices according to the rule set on the basis of the first information and the second information is output. Thus, a device according to the rule set on the basis of the first information and the second information can be recommended to the user among the devices installed outside the facility employed by the user.

In the information output method, in the determination of the one or more recommendation devices, a setting of a rule by the user based on the first information and the second information may be accepted, and the one or more recommendation devices may be determined among the second devices according to the rule.

In this configuration, recommendation information concerning recommendation of one or more recommendation devices determined among the second devices according to the rule based on the first information and the second information and set by the user is output. Thus, a device according to the rule set by the user on the basis of the first information and the second information can be recommended to the user among the devices installed outside the facility employed by the user.

In the information output method, in the output of the recommendation information, when it is detected that a current position of the user is within a predetermined distance from an installation position of at least one recommendation device of the one or more recommendation devices, information concerning recommendation of the at least one recommendation device may be further output as the recommendation information.

In this configuration, when it is detected that a current position of the user is within a predetermined distance from an installation position of at least one recommendation device of the one or more recommendation devices, recommendation information concerning recommendation of the at least one recommendation device is output. Thus, the at least one recommendation device can be recommended to the user when the user approaches the at least one recommendation device. This can increase the probability that the user uses a nearby device that has been recommended.

In the information output method, in the output of the recommendation information, information indicative of a position of a group of facilities for encouraging a replacement of a device may be further acquired, and when it is detected that a current position of the user is within a predetermined first distance from at least one facility in the group of facilities, information concerning recommendation of at least one recommendation device among the one or more recommendation devices that is installed within a predetermined second distance from the at least one facility may be further output as the recommendation information.

In this configuration, when it is detected that the current position of the user is within the first distance from at least one facility in the group of facilities for encouraging a replacement of a device, recommendation information concerning recommendation of at least one recommendation device among the one or more recommendation devices that is installed within the second distance from the at least one facility is output.

Thus, at least one recommendation device installed in the vicinity of at least one facility for encouraging a replacement of a device can be recommended to the user among the one or more recommendation devices when the user approaches the at least one facility. This can increase the probability that the user tries to use a nearby device that has been recommended. The probability that the user considers a replacement of a device can be increased consequently.

In the information output method, in the output of the recommendation information, history information indicative of a history of usage of the first device by the user may be further acquired, and when it is detected with reference to the history information that use frequency of the first device by the user varies a certain degree or more during a latest first period than during a second period before the first period, the recommendation information may be further output.

In this configuration, when it is detected that the use frequency of the first device by the user varies a certain degree or more during the latest first period than during the second period before the first period, recommendation information concerning recommendation of one or more recommendation devices is output. Thus, one or more recommendation devices installed outside the facility can be recommended to the user when the use frequency of the first device significantly varies. This can increase the probability that the user considers a replacement of the first device.

In the information output method, in the output of the recommendation information, a notification indicating that the user has required an external device to provide information on at least one recommendation device among the one or more recommendation devices may be further accepted, and information concerning recommendation of the at least one recommendation device may be further output as the recommendation information when the notification is accepted.

In this configuration, when a notification indicating that the user has required an external device to provide information on at least one recommendation device is accepted, recommendation information concerning recommendation of the at least one recommendation device is output. Thus, at least one recommendation device can be recommended to the user when the user requires the external device to provide information on the at least one recommendation device.

In the information output method, in the output of the recommendation information, price information indicative of a price of the one or more recommendation devices may be further acquired periodically, and when at least one recommendation device among the one or more recommendation devices is detected to involve a reduction of a predetermined rate or more in the price indicated by the price information to the price indicated by previously acquired price information, information concerning recommendation of the at least one recommendation device may be further output as the recommendation information.

In this configuration, when at least one recommendation device is detected to involve a reduction of a predetermined rate or more in the price to the previous price, recommendation information concerning recommendation of the at least one recommendation device is output. Thus, the at least one recommendation device can be recommended to the user when the price of the at least one recommendation device is significantly reduced. This can motivate the user to purchase at least one recommendation device with a reduced price.

In the information output method, in the output of the recommendation information, the recommendation information may be further output periodically.

This configuration enables periodic recommendation of one or more recommendation devices to the user. This can increase the probability that the user considers a replacement of the first device.

In the information output method, in the output of the recommendation information, an input of information that the user requires an output of the recommendation information may be further accepted, and the recommendation information may be further output when the information concerning the requirement of the output of the recommendation information is accepted.

In this configuration, when an input of information that the user requires an output of the recommendation information is accepted, recommendation information concerning recommendation of one or more recommendation devices is output. This enables the user to grasp the recommendation information immediately by inputting the information for requiring an output of the recommendation information at an intended time.

In the information output method, in the output of the recommendation information, information indicative of a group of functions that are recommendation objects of each of the group of recommendation devices recommended by the recommendation information may be further acquired, and information concerning recommendation of the group of functions that are the recommendation objects may be further output together with the recommendation information.

In this configuration, information concerning recommendation of a group of functions that are recommendation objects of each of the group of recommendation devices recommended by the recommendation information is output together with the recommendation information. This can motivate the user to use the group of functions that are the recommendation objects of each of the group of recommendation devices recommended by the recommendation information.

In the information output method, in the output of the recommendation information, information indicative of a group of relevant products relevant to each of the group of recommendation devices recommended by the recommendation information may be further acquired, and information concerning recommendation of the group of relevant products may be further output together with the recommendation information.

In this configuration, information indicative of a group of relevant products relevant to each of the group of recommendation devices recommended by the recommendation information is output together with the recommendation information. Thus, not only the group of recommendation devices recommended by the recommendation information but also the group of relevant products relevant to each of the group of recommendation devices can be recommended to the user.

In the information output method, the first information may include a usage period of the first device, the second information may include an installation position of each of the second devices, movement history information indicative of a history of a current position of the user and log information indicative of an operational state of each of the second devices may be further acquired, and information on at least one of use and purchase by the user of each recommendation device in the group of recommendation devices recommended by the output recommendation information may be further stored with reference to the first information, the second information, the movement history information, and the log information.

In this configuration, information on at least one of use and purchase by the user of each recommendation device in the group of recommendation devices recommended by the output recommendation information is stored. Therefore, a reference to the stored information on at least one of use and purchase by the user of each recommendation device in the group of recommendation devices recommended by the recommendation information enables a grasp of the at least one thereof. Thus, the influence on at least one of use and purchase by the user of a device that is exerted by the recommendation of the recommendation devices by the recommendation information can be grasped.

In the information output method, the first information may include a usage period of the first device, the second information may include information on an installation position and purchase of each of the second devices, movement history information indicative of a history of a current position of the user and log information indicative of an operational state of each of the second devices may be further acquired, and when it is detected with reference to the first information, the second information, the movement history information, and the log information that the user uses one recommendation device in the group of recommendation devices recommended by the output recommendation information, information on purchase of the one recommendation device may be further output.

In this configuration, when it is detected that the user uses one recommendation device in the group of recommendation devices recommended by the output recommendation information, information on purchase of the one recommendation device is output. This can make the user that has used one recommendation device recommended by the recommendation information quickly refer to information on purchase of the one recommendation device. Thus, the purchase intention of the user for the one recommendation device can be increased.

An information output apparatus according to another aspect of the present disclosure includes: a first acquisition part for acquiring first information on a first device installed in a facility employed by a user; a second acquisition part for acquiring second information on a plurality of second devices installed outside the facility; a determination part for determining, on the basis of the first information and the second information, one or more recommendation devices to replace the first device among the second devices; and an output part for outputting recommendation information concerning recommendation of the one or more recommendation devices to the user.

This configuration exerts the same advantageous effects as those described for the information output method.

A non-transitory computer readable storage medium according to another aspect of the present disclosure is a non-transitory computer readable storage medium storing a program causing a computer to serve as: a first acquisition part for acquiring first information on a first device installed in a facility employed by a user; a second acquisition part for acquiring second information on a plurality of second devices installed outside the facility; a determination part for determining, on the basis of the first information and the second information, one or more recommendation devices to replace the first device among the second devices; and an output part for outputting recommendation information concerning recommendation of the one or more recommendation devices to the user.

This configuration exerts the same advantageous effects as those described for the information output method.

The disclosure can be realized as a system operated by the program. Additionally, it goes without saying that the program is distributable as a non-transitory computer readable storage medium like a CD-ROM, or distributable via a communication network like the Internet.

Each of the embodiments which will be described below represents a specific example of the disclosure. Numerical values, shapes, constituent elements, data structures, steps, and the order of the steps described below are mere examples, and thus should not be construed to delimit the disclosure. Further, constituent elements which are not recited in the independent claims each showing the broadest concept among the constituent elements in the embodiments are described as selectable constituent element. The respective contents are combinable with each other in all the embodiments.

EMBODIMENTS

An embodiment of the present disclosure will be described below with reference to the drawings. FIG. 1 is a diagram showing an exemplary general structure of a device recommendation system 1 according to the embodiment of the present disclosure. The device recommendation system 1 includes at least one device 20 and sensor 21 installed in a facility 2 employed by a user, a user terminal 30, a first database (hereinafter, first DB) 41, a second database (hereinafter, second DB) 42, a log database (hereinafter, log DB) 43, a web server 50 (an exemplary external device), and a server 10 (an exemplary information output apparatus).

The device 20, the sensor 21, the user terminal 30, the first DB 41, the second DB 42, the log DB 43, the web server 50, and the server 10 are communicably connected with each other through a communication network 90. The communication network 90 is, for example, a public communication line such as the Internet.

The device 20 and the sensor 21 may be communicably connected to another device 20, another sensor 21, and the user terminal 30 through a local network in the facility 2. The facility 2 is, for example, a house. The house is a multifamily residential, or may be a detached house. The facility 2 may be an office. In the case that the facility 2 is a house, the user of the device 20 includes a resident. In the case that the facility 2 is an office, the user of the device 20 includes an employer of the office. Hereinafter, a resident in the facility 2 and an employer thereof are referred to as the user.

The device 20 includes an electronic device that is installed in the facility 2 and hard to exchange for the user by him/herself, and has a long durable life (for example, 10 years, or 5 years), e.g., a toilet, a bathtub, or an electronic lock. The device 20 periodically transmits log information indicative of an operational state thereof to the server 10. The server 10 acquires the log information from the device 20 to store it in the log DB 43.

The log information transmitted by the device 20 includes a transmission date and time of the log information, identification information of the device 20 (hereinafter, device ID), and the operational state of the device 20. The operational state of the device 20 includes an idle state in which the device 20 stands by for an action, a state in which the device 20 is in use, and a state in which the device 20 has an abnormality.

An exemplary case where the device 20 is a toilet and one device 20 (toilet) is installed in a facility 2 employed by one specific user will be described below.

The sensor 21 periodically detects information on a space where the sensor 21 is installed. The sensor 21 periodically transmits to the server 10 sensor information including the detected information (hereinafter, detection information). The server 10 acquires the sensor information from the sensor 21 to store it in the log DB 43. The sensor information transmitted by the sensor 21 includes the detection information, a date and time of detection of detection information (hereinafter, detection date and time), and identification information of the sensor 21 (hereinafter, sensor ID).

The sensor 21 includes a surveillance camera and a human detection sensor. The surveillance camera takes an image of a space where the surveillance camera is installed, and transmits sensor information that includes image data indicative of the taken image as the detection information. The human detection sensor detects whether or not there is a person in a space where the human detection sensor is installed. When detecting that there is a person in the space, the human detection sensor transmits sensor information that includes information indicative of a position of the person as the detection information.

The user terminal 30 is an information communication terminal that is used by a user employing the facility 2, e.g., a laptop computer, a smartphone, or a tablet.

The user terminal 30 has a liquid crystal display for displaying each text information and image, a speaker for outputting sound indicated by each sound data, and a control implement for commencing various controls of the user terminal 30 such as input of information, e.g., a touchscreen or a hard key. The user terminal 30 includes a GPS sensor for detecting a position of the user terminal 30 and a communication circuit for communication with an external device such as the server 10 through the communication network 90.

The user terminal 30 displays text information and an image indicated by image data transmitted to an address for notification of information to the user of the user terminal 30 on the liquid crystal display when the communication circuit receives the text information and the image data. The user terminal 30 causes the speaker to output sound indicated by sound data transmitted to the address for notification of information to the user of the user terminal 30 when the communication circuit receives the sound data.

The user terminal 30 periodically transmits information (hereinafter, movement history information) on a current position of the user of the user terminal 30 to the server 10. The movement history information includes identification information (hereinafter, user ID) of the user of the user terminal 30, a current date and time when the GPS sensor detects the position of the user terminal 30, and the current position of the user. The current position of the user is represented by the position of the user terminal 30 detected by the GPS sensor.

The first DB 41 includes one or more storage devices, e.g., a hard disk drive (HDD) or a solid state drive (SSD). The first DB 41 is stored with information (hereinafter, first information) on the device 20 installed in the facility 2 employed by the user.

Figure 2:
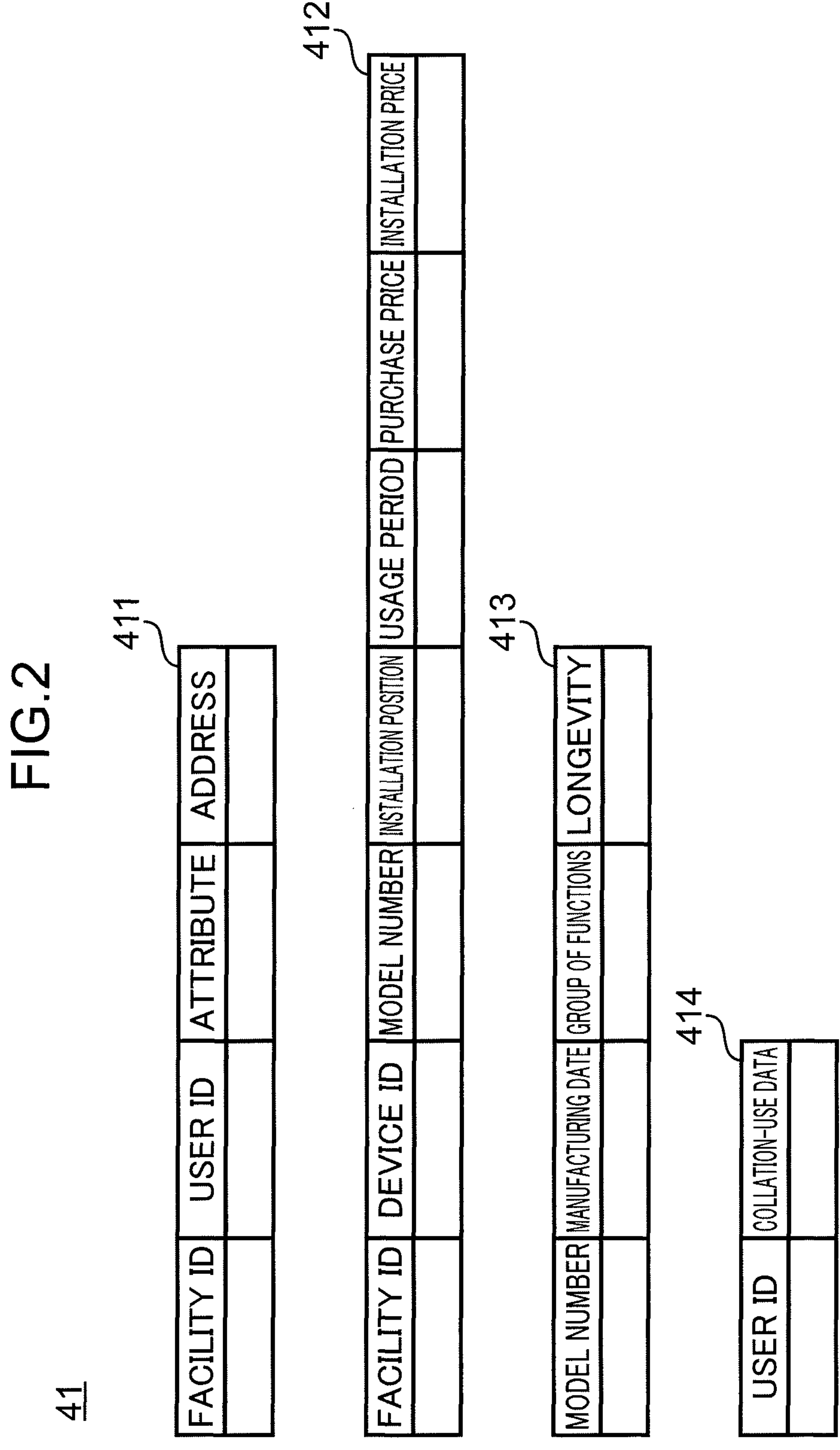
FIG. 2 shows exemplary information stored in a first database.

FIG. 2 shows exemplary first information stored in the first DB 41. As shown in FIG. 2, the first information stored in the first DB 41 includes, for example, user information 411 on each of one or more users of the facility 2 employed by the user, device management information 412 for managing the device 20, and specification information 413 indicative of a specification of the device 20. The first information further includes collation-use information 414 for identifying each of the one or more users of the facility 2 employed by the user.

The user information 411 includes identification information of the facility 2 (hereinafter, facility ID) employed by the user, a user ID of each of the one or more users of the facility 2, attribute information indicative of an attribute of a user associated with a user ID, and address information indicative of an address for notification of information to the user associated with the user ID. The attribute information includes the sex and the age of the user. The address information includes an IP address of the user terminal 30 used by the user.

The device management information 412 includes a facility ID of a facility 2 in which a device 20 is installed, a device ID, model number information indicative of a model number of the device 20, installation position information indicative of a position at which the device 20 is installed, and usage period information indicative of a usage period of the device 20. The device management information 412 further includes purchase price information indicative of a purchase price of the device 20, and installation price information indicative of a cost necessary for installing the device 20 in the facility 2.

The usage period of the device 20 is a period from the date and time when the device 20 begins to be used to the present. For example, the usage period information may include only information indicative of the date and time when the device 20 begins to be used. In this case, the period from the date and time when the device 20 begins to be used indicated by the usage period information to the present represents the usage period of the device 20. The date and time when the device 20 begins to be used may be a date and time when the device 20 is installed in the facility 2.

The specification information 413 includes the model number information, manufacturing date information indicative of a date when a device 20 with a model number indicated by the model number information is manufactured, function group information indicative of a group of functions that the device 20 with the model number indicated by the model number information has, and longevity information indicative of the longevity of the device 20 with the model number indicated by the model number information.

The group of functions includes, for example, a function of bubble washing and a function of automatically opening/closing the toilet seat, but is not limited to this; the group of functions may include each of functions of the same kind but different in performance (for example, a function of semi-automatic bubble washing and a function of fully automatic bubble washing). A group of functions described below is similar to these.

The collation-use information 414 includes the user ID of each of the one or more users of the facility 2 employed by the user and collation-use data. The collation-use data is data used for a collation with the sensor information to identify each of the one or more users. Specifically, the collation-use data includes each data indicative of a feature of a user, e.g., image data indicative of a taken image of the face or the whole body of the user and sound data indicative of the voice of the user.

The second DB 42 includes one or more storage devices, e.g., an HDD or an SSD. The second DB 42 is stored with information (hereinafter, second information) on a device 20 installed outside the facility 2 employed by the user. The outside of the facility 2 employed by the user includes, for example, a public facility such as a public institution, a commercial facility, a park, a model room, or a vacant room in a hotel. The outside of the facility 2 employed by the user may include a facility 2 employed by an individual, e.g., a house.

Figure 3:
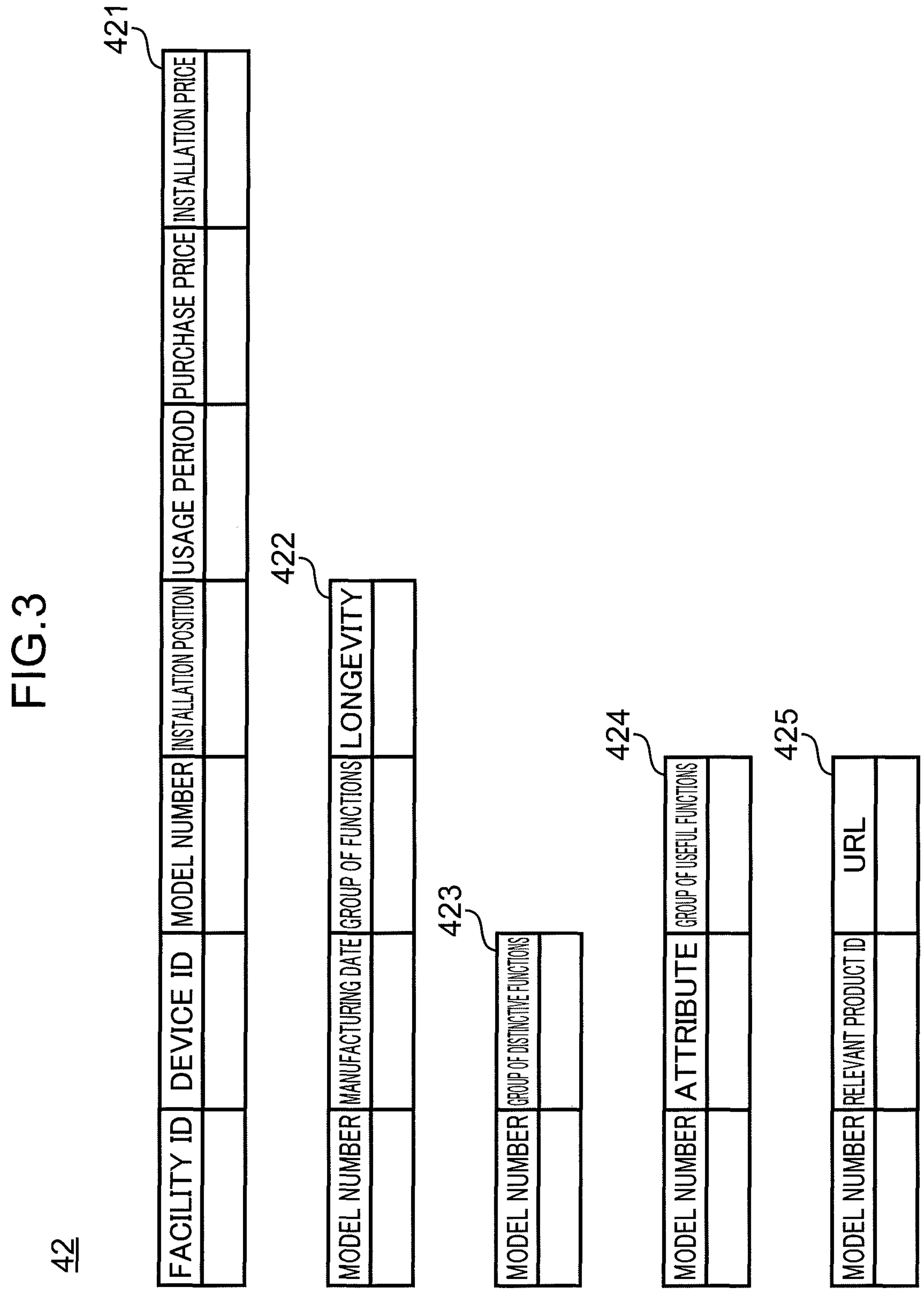
FIG. 3 shows exemplary information stored in a second database.

FIG. 3 shows exemplary second information stored in the second DB 42. As shown in FIG. 3, the second information stored in the second DB 42 includes, for example, device management information 421 for managing a device 20 and specification information 422 indicative of a specification of the device 20. The second information further includes distinctive function information 423 indicative of a group of distinctive functions that the device 20 has, useful function information 424 indicative of a group of useful functions that the device 20 has, and relevant product information 425 on a relevant product that is relevant to the device 20.

Similarly to the device management information 412 included in the first information, the device management information 421 includes a facility ID of an outside facility 2 where a device 20 is installed, a device ID, the model number information, the installation position information, the usage period information, the purchase price information, and the installation price information.

Similarly to the specification information 413 included in the first information, the specification information 422 includes the model number information, the manufacturing date information, the function group information, and the longevity information.

The distinctive function information 423 includes the model number information and distinctive function group information indicative of a group of distinctive functions in the group of functions that the device 20 with the model number indicated by the model number information has. The group of distinctive functions includes, for example, a function that has been greatly improved and a function that has been newly added.

The useful function information 424 includes the model number information, the attribute information, and useful function group information. The useful function group information is information indicative of a group of useful functions useful for an attribute of a user indicated by the attribute information, in the group of functions that the device 20 with the model number indicated by the model number information has. For example, useful function information 424 including attribute information indicating that the user is senior has useful function group information indicative of a group of functions useful for a senior user.

The relevant product information 425 includes the model number information, identification information (hereinafter, relevant product ID) of a relevant product to the device 20 with the model number indicated by the model number information, and a URL of a website showing information on the relevant product. In the case that the device 20 is a toilet, the relevant product includes, for example, a tool and a detergent for cleaning a toilet, and an aromatic.

Figure 4:
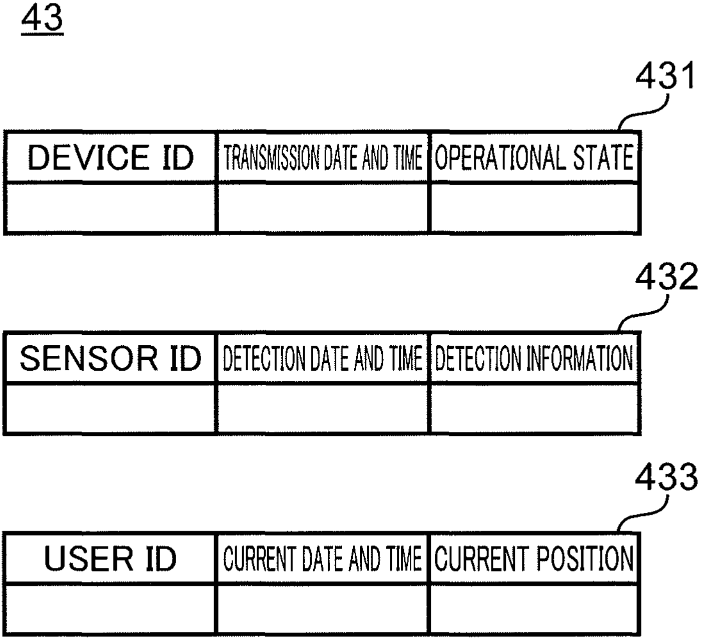
FIG. 4 shows exemplary information stored in a log database.

The log DB 43 includes one or more storage devices, e.g., an HDD or an SSD. FIG. 4 shows exemplary information stored in the log DB 43. The log DB 43 is stored with log information 431 that the server 10 receives from the device 20, sensor information 432 that the server 10 receives from the sensor 21, and movement history information 433 that the server 10 receives from the user terminal 30.

As described above, the log information 431 includes the device ID, the transmission date and time of the log information 431, and the operational state of the device 20. The sensor information 432 includes the sensor ID, the detection date and time, and the detection information. The movement history information 433 includes the user ID, the current date and time, and the current position of the user.

The web server 50 includes a server device or a cloud server. The web server 50 sends back to an external device a webpage following a requirement sent from the external device through the communication network 90. For example, the web server 50 sends back to the external device a webpage corresponding to a URL sent from the external device. Alternatively, the web server 50 searches for a webpage including a search key designated by the external device, and sends back the corresponding webpage to the external device.

Figure 5:
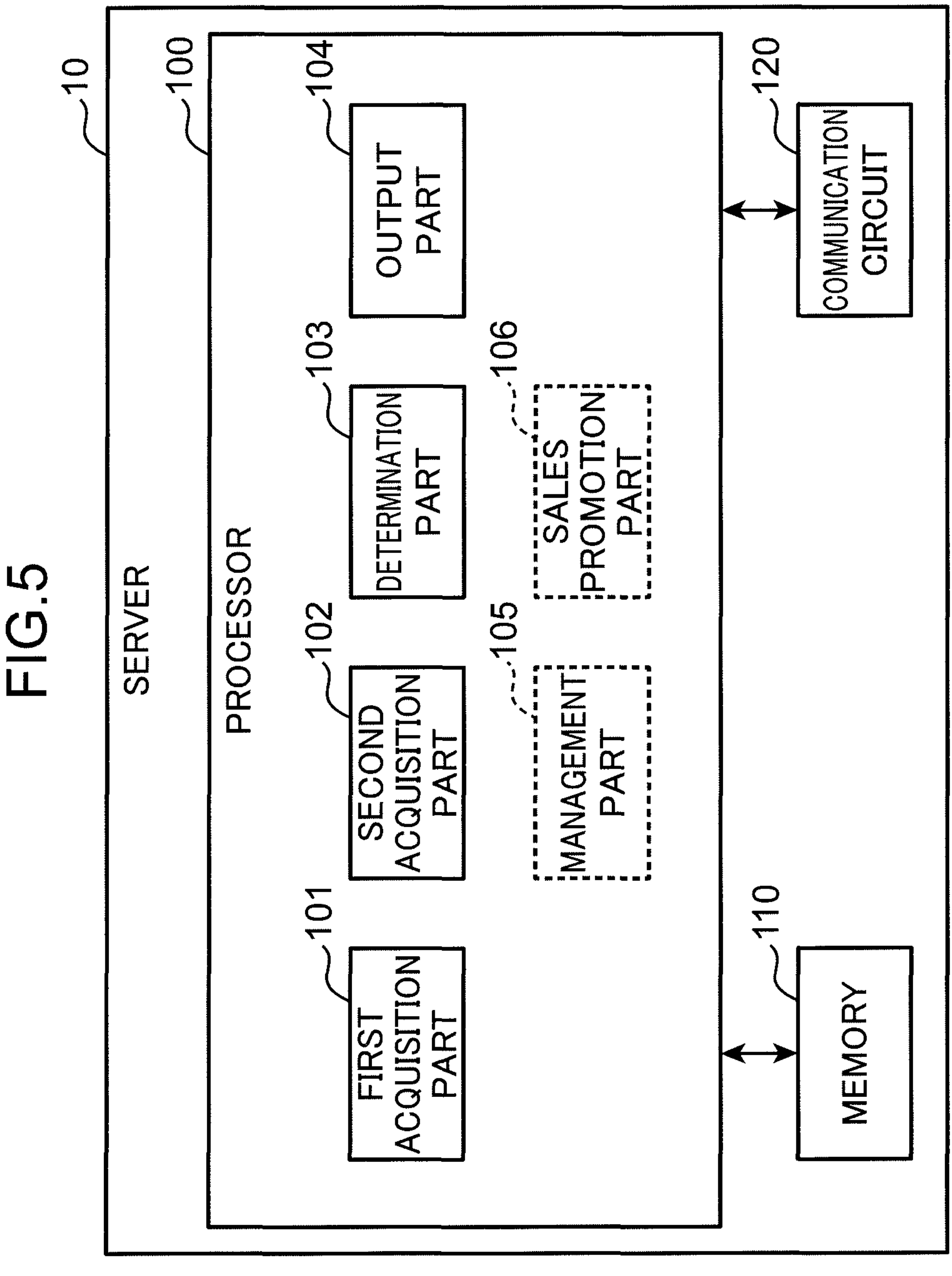
FIG. 5 is a block diagram showing an exemplary structure of a server.

The server 10 includes a server device or a cloud server. FIG. 5 is a block diagram showing an exemplary structure of the server 10. The server 10 includes a communication circuit 120, a processor 100 (an exemplary computer), and a memory 110.

The communication circuit 120 is compatible with a communication system by use of the communication network 90 such as Ethernet (registered trademark) to connect the server 10 to the communication network 90. The communication circuit 120 outputs to the processor 100 each of the received information from the external device through the communication network 90. The communication circuit 120 transmits each of the information to the external device connected to the communication network 90 through the communication network 90 under control by the processor 100.

The processor 100 includes, for example, a CPU. The processor 100 controls the server 10. The processor 100 serves as a first acquisition part 101, a second acquisition part 102, a determination part 103, and an output part 104 shown by rectangles in a solid line in FIG. 5. The first acquisition part 101 to the output part 104 may do performance when the processor 100 executes a certain program, or may be constituted by dedicated hardware.

The first acquisition part 101 acquires from the first DB 41 the first information on the device 20 installed in the facility 2 employed by the user. Hereinafter, a device 20 installed in the facility 2 employed by the user is referred to as a first device 20.

The second acquisition part 102 acquires from the second DB 42 the second information on a plurality of devices 20 installed outside the facility 2 employed by the user. Hereinafter, a device 20 installed outside the facility 2 employed by the user is referred to as a second device 20.

The determination part 103 determines, on the basis of the first information and the second information, one or more recommendation devices to replace the first device 20 among the second devices 20. The recommendation device to replace the first device 20 means a second device 20 that is installable in the facility 2 where the first device 20 is installed in replacement of the first device 20.

The output part 104 outputs recommendation information concerning recommendation of the one or more recommendation devices to the user.

Figure 6:
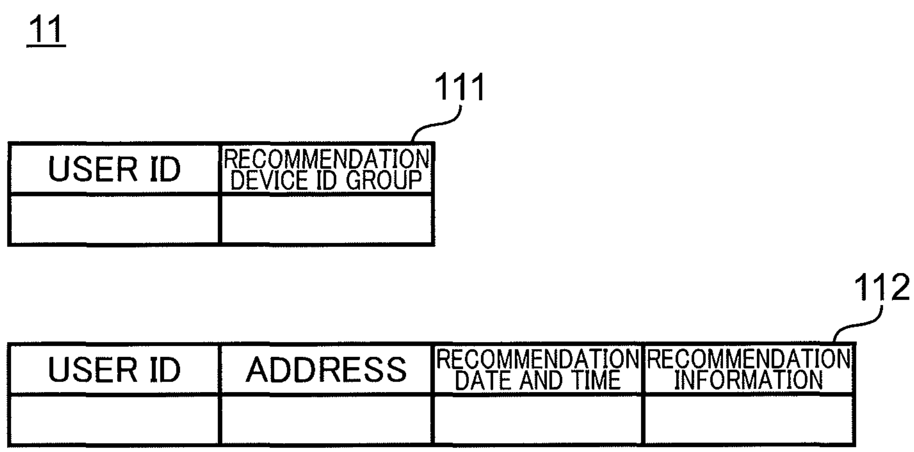
FIG. 6 shows exemplary information stored in a memory of the server.

The memory 110 includes: a rewritable non-volatile semiconductor memory such as a flash memory; an HDD; and an SSD. FIG. 6 shows exemplary information stored in the memory 110 of the server 10. The memory 110 is stored with, e.g., a candidate device list 111 and recommendation history information 112.

The candidate device list 111 represents information on one or more recommendation devices determined by the determination part 103. Specifically, the candidate device list 111 includes the user ID, identification information (hereinafter, recommendation device ID group) of the one or more recommendation devices determined by the determination part 103.

The recommendation history information 112 is information on a history of output of recommendation information. Specifically, the recommendation history information 112 includes the user ID, the address information, recommendation date-and-time information indicative of a date and time (hereinafter, recommendation date and time) when recommendation information is output, and the recommendation information.

Candidate Device List Creation

Figure 7:
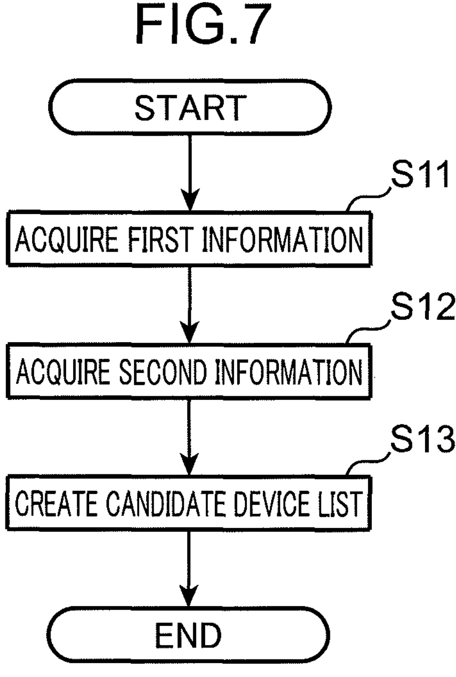
FIG. 7 is a flowchart showing steps of an exemplary candidate device list creation.

Next, the candidate device list creation executed by the server 10 will be described. FIG. 7 is a flowchart showing steps of an exemplary candidate device list creation. The candidate device list creation is executed periodically, for example, one time a day.

At the start of the candidate device list creation, the first acquisition part 101 acquires from the first DB 41 the first information (FIG. 2) on the first device 20 (Step S11). Next, the second acquisition part 102 acquires from the second DB 42 the second information (FIG. 3) on a plurality of second devices 20 (Step S12). Next, the determination part 103 creates a candidate device list 111 (FIG. 6) on the basis of the first information acquired in Step S11 and the second information acquired in Step S12 (Step S13).

For example, in a case that the longevity of the device 20 installed in the facility 2 employed by the user is close to the end, the determination part 103 determines in Step S13 one or more second devices 20 manufactured later than the device 20 as one or more recommendation devices to replace the first device 20.

Specifically, the determination part 103 refers to the device management information 412 and the specification information 413 included in the first information and refers to the device management information 421 and the specification information 422 included in the second information. The determination part 103 then calculates a ratio of the usage period (e.g., eight years) of the first device 20 to the longevity (e.g., ten years) of the first device 20 (=usage period/longevity). The determination part 103 determines that the longevity of the first device 20 is close to the end in the case that the ratio (e.g., 0.8) is larger than a predetermined ratio (e.g., 0.7). In this case, the determination part 103 determines one or more second devices 20 with a manufacturing date (e.g., Sep. 15, 2021) newer than the manufacturing date (e.g., Aug. 1, 2021) of the first device 20 among the second devices 20 as the one or more recommendation devices.

The determination part 103 then creates a candidate device list 111 (FIG. 6) including the user ID and identification information (recommendation device ID group) of the determined one or more recommendation devices, and stores the candidate device list 111 in the memory 110.

Recommendation Information Output

Figure 8:
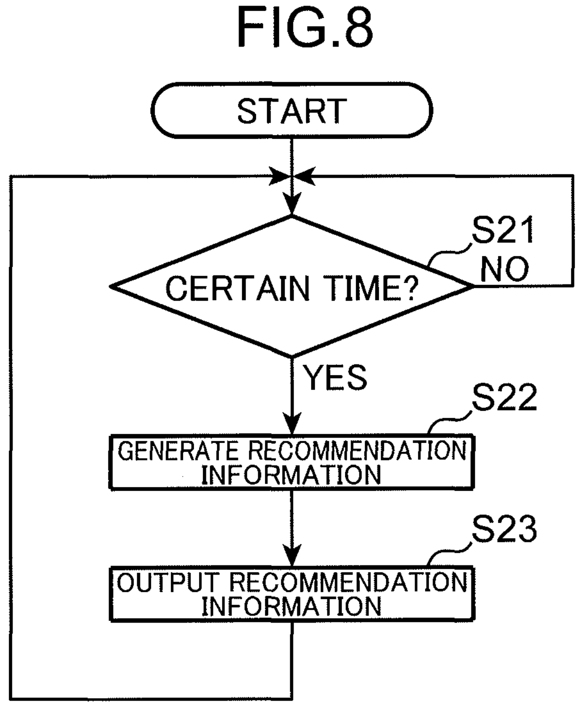
FIG. 8 is a flowchart showing steps of an exemplary recommendation information output.

Next, the recommendation information output executed by the server 10 will be described. FIG. 8 is a flowchart showing steps of an exemplary recommendation information output. The recommendation information output is started at any time after at least one candidate device list creation is executed.

At the start of the recommendation information output, the output part 104 stands by until a certain time to output recommendation information (NO in Step S21). The output part 104 generates, at the certain time (YES in Step S21), recommendation information concerning recommendation of the one or more recommendation devices indicated by the candidate device list 111 to the user (Step S22). Next, the output part 104 outputs the recommendation information generated in Step S22 (Step S23). Thereafter, the steps after Step S21 are repeated.

For example, the output part 104 determines in Step S21 that the certain time has come when detecting that the current position of the user is within a predetermined distance from an installation position of at least one recommendation device of the one or more recommendation devices indicated by the candidate device list 111.

Specifically, in Step S21, the output part 104 acquires from the log DB 43 movement history information 433 (FIG. 4) including the latest current date and time, as movement history information 433 indicative of the current position of the user.

The output part 104 refers to the movement history information 433 and the device management information 421 (FIG. 3) included in the second information acquired in the latest candidate device list creation. The output part 104 then determines whether or not at least one second device 20 of which installation position is within a predetermined distance from the current position of the user exists among the one or more second devices 20 determined as the one or more recommendation devices indicated by the recommendation device ID group in the candidate device list 111 (FIG. 6).

The output part 104 detects that the current position of the user is within the predetermined distance from the installation position of at least one recommendation device of the one or more recommendation devices indicated by the candidate device list 111, when determining that the at least one second device 20 exists. In this case, the output part 104 determines that the certain time has come, and generates in Step S22 (FIG. 8) recommendation information concerning recommendation of the at least one second device 20.

The recommendation information is, for example, text information, image data, and/or sound data to encourage a try to use the group of devices recommended by the recommendation information. The recommendation information is not limited to this, and may be, for example, text information, image data, and/or sound data to induce purchase of the group of devices recommended by the recommendation information.

The way of detection by the output part 104 as to whether or not the current position of the user is within the predetermined distance from an installation position of at least one recommendation device is not limited to this.

For example, among the one or more second devices 20 determined as the one or more recommendation devices indicated by the recommendation device ID group in the candidate device list 111 (FIG. 6), a second device 20 exists that has a wireless communication circuit enabling short-range wireless communication with an external device within a predetermined distance; the user terminal 30 has a similar wireless communication circuit; and the user having the user terminal 30 comes within an area for the short-range wireless communication with the second device 20 and it is detected that the user terminal 30 and the second device 20 are communicable with each other through the short-range wireless communication.

In this example, the user terminal 30 or the second device 20 may transmit to the server 10 the device ID of the second device 20 together with information (hereinafter, approach information) indicative of approach of an external device.

The output part 104 may accordingly determine in Step S21 (FIG. 8), in the case that the communication circuit 120 receives the approach information, whether or not a device ID received together with the approach information is included in the recommendation device ID group in the candidate device list 111 (FIG. 6). Further, the output part 104 may detect that the current position of the user is within the predetermined distance from the installation position of the recommendation device indicated by the device ID and determine that the certain time has come, when determining that the device ID is included in the recommendation device ID group.

In this case, in Step S22 (FIG. 8), the output part 104 regards the second device 20 indicated by the device ID received together with the approach information as a recommendation device included in the one or more recommendation devices indicated by the candidate device list 111 and generates recommendation information concerning recommendation of the recommendation device.

In Step S23 (FIG. 8), the output part 104 refers to the first information (FIG. 2) acquired in the latest candidate device list creation and transmits the recommendation information generated in Step S22 (FIG. 8) to the address indicated by the address information included in the user information 411. Additionally, the output part 104 generates recommendation history information 112 (FIG. 6) including the user ID, the address information indicative of a destination of the transmission of the recommendation information, the recommendation date and time of the output of the recommendation information, and the recommendation information, and stores it in the memory 110.

The user terminal 30 that has received the recommendation information displays text information and an image indicated by image data included in the recommendation information on its liquid crystal display, and causes its speaker to output sound indicated by sound data included in the recommendation information.

In the configuration of the embodiment, one or more recommendation devices to replace the first device 20 can be appropriately determined among the second devices 20 on the basis of the first information (FIG. 2) on the first device 20 installed in the facility 2 employed by the user and the second information (FIG. 3) on the second devices 20 installed outside the facility 2. Further, recommendation information concerning recommendation of the one or more recommendation devices is output and the user refers to the recommendation information; thus, the recommendation of the one or more recommendation devices installed outside the facility 2 can be achieved.

In the configuration of the embodiment, in a case that a ratio of the usage period of the first device 20 to the longevity of the first device 20 is larger than a predetermined ratio, recommendation information concerning recommendation of one or more second devices 20 with a manufacturing date newer than the manufacturing date of the first device 20 is output. Thus, a device 20 newer than the first device 20 can be recommended to the user among the devices 20 installed outside the facility 2 employed by the user in a case that the longevity of the first device 20 is close to the end.

In the configuration of the embodiment, when it is detected that a current position of the user is within a predetermined distance from an installation position of at least one recommendation device of the one or more recommendation devices, recommendation information concerning recommendation of the at least one recommendation device is output. Thus, the at least one recommendation device can be recommended to the user when the user approaches the at least one recommendation device. This can increase the probability that the user uses a nearby device 20 that has been recommended.

Modifications

In the present disclosure, the following modifications may be implemented.

(1) In Step S13 (FIG. 7), the determination part 103 may determine one or more recommendation devices to be included in the candidate device list 111 (FIG. 6) by at least one method shown in (1-1) to (1-5) below after referring to the first information (FIG. 2) and the second information (FIG. 3) acquired in Step S11 and Step S12 (FIG. 7).

(1-1) The determination part 103 may determine one or more second devices 20 having a function that the first device 20 does not have among the second devices 20 as the one or more recommendation devices.

Specifically, the determination part 103 refers to the device management information 412 and the specification information 413 included in the first information (FIG. 2) and recognizes the group of functions that the first device 20 has. The determination part 103 then refers to the device management information 421 and the specification information 422 included in the second information (FIG. 3) and determines one or more second devices 20 having a function that the first device 20 does not have among the second devices 20 as the one or more recommendation devices.

The method in (1-1) enables recommendation of a second device 20 having a function that the first device 20 does not have to the user. This can make the user get more interested in the second device 20.

(1-2) The determination part 103 may determine one or more second devices 20 having a distinctive function that the first device 20 does not have among the second devices 20 as the one or more recommendation devices.

Specifically, the determination part 103 refers to the device management information 412 and the specification information 413 included in the first information (FIG. 2) and recognizes the group of functions that the first device 20 has. The determination part 103 then refers to the device management information 421, the specification information 422, and the distinctive function information 423 included in the second information (FIG. 3), and determines one or more second devices 20 having a function that the distinctive function group information concerns and the first device 20 does not have among the second devices 20 as the one or more recommendation devices.

The method in (1-2) enables recommendation of a second device 20 having a distinctive function that the first device 20 does not have to the user. This can make the user get even more interested in the second device 20.

(1-3) Among the one or more second devices 20 determined as the one or more recommendation devices by the method in the embodiment above, (1-1) above, or (1-2) above, the determination part 103 may determine at least one second device 20 having a function that is included in a group of useful functions useful for an attribute of each of the one or more users employing the facility 2 employed by the user as the one or more recommendation devices.

Specifically, the determination part 103 refers to the device management information 421 and the specification information 422 included in the second information (FIG. 3) and recognizes the group of functions which each of the one or more second devices 20 has that are determined as the one or more recommendation devices by the method in the embodiment above, (1-1) above, or (1-2) above. The determination part 103 refers to the user information 411 included in the first information (FIG. 2) and the useful function information 424 included in the second information (FIG. 3), and recognizes a group of useful functions useful for an attribute of each of the one or more users.

The determination part 103 then determines, among the one or more second devices 20 determined as the one or more recommendation devices by the method in the embodiment above, (1-1) above, or (1-2) above, at least one second device 20 having a function that is included in the recognized group of useful functions as the one or more recommendation devices.

The method in (1-3) enables recommendation to the user under a limitation of the one or more recommendation devices determined by the method in (1-1) above or (1-2) above to one having a useful function for the attribute of each of the one or more users. This can make the user get even more interested in the recommended second device 20.

(1-4) The determination part 103 may acquire information indicative of a rule that is set on the basis of the first information (FIG. 2) and the second information (FIG. 3), and determine one or more recommendation devices among the second devices 20 according to the rule.

Specifically, the information indicative of the rule is set by a manufacturer of a second device 20 and stored in the memory 110 or the second DB 42 beforehand. For example, it turns out from a market survey that a user of a first device 20 having a function A tends to use a second device 20 having a function B. In this example, a rule can be set that one or more second devices 20 having the function B are determined with reference to the second information (FIG. 3) as the one or more recommendation devices in the case that the first device 20 is determined to have the function A with reference to the first information (FIG. 2). Thereafter, information indicative of the rule is stored in the memory 110 or the second DB 42 beforehand.

In this case, the determination part 103 acquires the information indicative of the rule from the memory 110 or the second DB 42, and refers to the device management information 412 and the specification information 413 included in the first information (FIG. 2) and determines whether or not the first device 20 has the function A according to the rule. In the case that the first device 20 has the function A, the determination part 103 refers to the device management information 421 and the specification information 422 included in the second information (FIG. 3), and determines one or more second devices 20 having the function B as the one or more recommendation devices.

The method in (1-4) enables flexibly setting a rule for determination of a second device 20 to be recommended to the user beforehand on the basis of the first information (FIG. 2) and the second information (FIG. 3).

(1-5) The determination part 103 may accept a setting of a rule by the user based on the first information (FIG. 2) and the second information (FIG. 3), and determine one or more recommendation devices among the second devices 20 according to the accepted rule, similarly to (1-4).

This configuration can be achieved, for example, as follows. A user performs a certain operation of setting information indicative of a rule based on the first information (FIG. 2) and the second information (FIG. 3) through the user terminal 30. In this example, the user terminal 30 transmits to the server 10 information (hereinafter, setting requiring information) requiring that the rule be set, together with the information indicative of the rule set by the user. The certain operation is a task of selecting one rule from a plurality of rules set by the manufacturer of the second device 20, or may be a task of the user voluntarily editing and setting information indicative of a rule based on the first information and the second information.

In the case that the communication circuit 120 receives the setting requiring information, the determination part 103 acquires the information indicative of the rule that the communication circuit 120 has received together with the setting requiring information to thereby accept setting the rule.

The method in (1-5) enables recommendation to the user of a second device 20 according to the rule set by the user himself on the basis of the first information (FIG. 2) and the second information (FIG. 3). This can make the user get even more interested in the recommended second device 20.

(2) In Step S21 (FIG. 8), the output part 104 may further determine that the certain time to output the recommendation information has come by the methods shown in (2-1) to (2-6) below.

(2-1) The output part 104 may acquire information indicative of a position of a group of facilities for encouraging a replacement of a device 20, and determine that the certain time has come when detecting that a current position of the user is within a predetermined first distance from at least one facility 2 in the group of facilities. The facility 2 for encouraging a replacement of a device 20 includes, for example, a home electronics store, a model room, and a show house where a new product for the device 20 is exhibited.

This configuration can be achieved, for example, as follows. The output part 104 requires the web server 50 to transmit information indicative of a position of a group of facilities for encouraging a replacement of a device 20. The output part 104 receives the information indicative of the position of the group of facilities sent back from the web server 50 in response to the requirement. The output part 104 acquires from the log DB 43 movement history information 433 (FIG. 4) including the latest current date and time, as movement history information 433 indicative of the current position of the user.

The output part 104 then refers to the acquired movement history information 433 and the information indicative of the position of the group of facilities, and detects whether or not the current position of the user is within a predetermined first distance from at least one facility 2 in the group of facilities for encouraging a replacement of a device 20.

In Step S22 (FIG. 8), the output part 104 refers to the device management information 421 (FIG. 3) included in the second information acquired in the latest candidate device list creation. The output part 104 then generates information serving as the recommendation information and concerning recommendation of at least one second device 20 that is installed within a predetermined second distance from the at least one facility 2, among the one or more second devices 20 determined as the one or more recommendation devices indicated by the candidate device list 111. The output part 104 then outputs the recommendation information in Step S23 (FIG. 8).

In this configuration, at least one recommendation device installed in the vicinity of at least one facility 2 for encouraging a replacement of a device 20 can be recommended to the user among the one or more recommendation devices indicated by the candidate device list 111 (FIG. 6) when the user approaches the at least one facility 2. This can increase the probability that the user tries to use a nearby recommendation device that has been recommended. The probability that the user considers a replacement of the first device 20 can be increased consequently.

(2-2) In Step S21 (FIG. 8), the output part 104 may acquire history information indicative of a history of usage of the first device 20 by the user. Thereafter, the output part 104 may determine that the certain time has come when detecting with reference to the history information that use frequency of the first device 20 by the user varies a certain degree or more during a latest first period than during a second period before the first period.

This configuration can be achieved, for example, as follows. The output part 104 acquires from the log DB 43 the log information 431 and the movement history information 433 (FIG. 4) as the history information. The output part 104 refers to the log information 431 and the movement history information 433, and the device management information 421 (FIG. 3) included in the second information acquired in the past candidate device list creation, and recognizes the operational state of the first device 20 at a time when the user is present at the installation position of the first device 20. In the case that the operational state indicates that the device 20 is in use, the output part 104 determines that the user uses the first device 20 at the time.

The output part 104 thus calculates the number of times of use of the first device 20 by the user during the latest first period (e.g., a month) and the number of times of use of the first device 20 by the user during the second period (e.g., a month) before the first period. The output part 104 determines that the certain time has come when detecting that the number of times of use of the first device 20 by the user varies a certain number of times or more during the latest first period than during the second period before the first period.

Alternatively, the output part 104 may calculate an average per day of the number of times of use of the first device 20 by the user during each of the latest first period and the second period before the first period. The output part 104 may determine that the certain time has come when detecting that the average per day of the number of times of use of the first device 20 by the user varies a certain value or more during the latest first period than during the second period before the first period.

In this configuration, one or more recommendation devices installed outside the facility 2 can be recommended to the user when the use frequency of the first device 20 significantly varies due to, for example, an increase in the number of users of the facility 2 employed by the user or a change of the lifestyle of the user. This can increase the probability that the user considers a replacement of the first device 20.

(2-3) In Step S21 (FIG. 8), the output part 104 may accept a notification indicating that the user has required an external device such as the web server 50 to provide information on at least one recommendation device among the one or more recommendation devices indicated by the candidate device list 111 (FIG. 6). The output part 104 may determine that the certain time has come when accepting the notification.

This configuration can be achieved, for example, as follows. The web server 50 sends back to the user terminal 30 a webpage that includes information on one or more second devices 20 among the second devices 20 and meets a requirement sent from the user terminal 30. In this example, the web server 50 transmits to the server 10 the device IDs of the one or more second devices 20 included in the sent webpage together with information (hereinafter, response information) indicating that a response to the requirement has been made.

The output part 104 acquires the device IDs of the one or more second devices 20 that the communication circuit 120 has received together with the response information, when the communication circuit 120 receives the response information. The output part 104 accepts the notification and determines that the certain time has come, in the case that at least one device ID among the acquired device IDs of the one or more second devices 20 is included in the recommendation device ID group in the candidate device list 111 (FIG. 6).

The output part 104 generates information serving as the recommendation information and concerning recommendation of the at least one second device 20 indicated by the at least one device ID included in the recommendation device ID group in the candidate device list 111 (FIG. 6) in Step S22 (FIG. 8), and outputs the recommendation information in Step S23 (FIG. 8).

In this configuration, recommendation information concerning recommendation of at least one recommendation device can be recommended to the user when the user requires the web server 50 to provide information on the at least one recommendation device included in the one or more recommendation devices indicated by the candidate device list 111 (FIG. 6).

In this configuration, in Step S22 (FIG. 8), in the case that the user has used a certain device group in the at least one second device 20 recommended by the recommendation information in the past, the output part 104 may further include in the recommendation information, information indicating that the user has used the certain device group.

Specifically, the output part 104 refers to the second information (FIG. 3) stored in the second DB 42 and the log information 431 and the movement history information 433 (FIG. 4) stored in the log DB 43. The output part 104 then determines whether or not each device 20 included in the at least one second device 20 has been used by the user, on the basis of whether or not each device 20 is in the operational state of in use at a time when the user is present at the installation position of each device 20.

(2-4) In Step S21 (FIG. 8), the output part 104 may periodically acquire price information indicative of a price of the one or more recommendation devices indicated by the candidate device list 111 (FIG. 6). The output part 104 may determine that the certain time has come when detecting that at least one recommendation device among the one or more recommendation devices indicated by the candidate device list 111 involves a reduction of a predetermined rate or more in the price indicated by the price information to the price indicated by previously acquired price information.

This configuration can be achieved, for example, as follows. The output part 104 requires the web server 50 to periodically transmit price information indicative of a price of the one or more recommendation devices indicated by the candidate device list 111 (FIG. 6). The output part 104 acquires the price information sent back from the web server 50 in response to the requirement. The output part 104 determines that the certain time has come when detecting that at least one recommendation device among the one or more recommendation devices indicated by the candidate device list 111 involves a reduction of a predetermined rate or more in the price indicated by the acquired price information to the price indicated by previously acquired price information.

The output part 104 generates information serving as the recommendation information and concerning recommendation of the at least one recommendation device that involves the reduction of the predetermined rate or more in the price in Step S22 (FIG. 8), and outputs the recommendation information in Step S23 (FIG. 8).

In this configuration, at least one recommendation device among the one or more recommendation devices indicated by the candidate device list 111 (FIG. 6) can be recommended to the user when the price of the at least one recommendation device is significantly reduced. This can motivate the user to purchase at least one recommendation device with a reduced price.

(2-5) In Step S21 (FIG. 8), the output part 104 may determine that the certain time has come periodically, e.g., once a year.

This configuration enables periodic recommendation of one or more recommendation devices to the user. This can increase the probability that the user considers a replacement of the first device 20.

In this configuration, in Step S22 (FIG. 8), the output part 104 may restrict the upper limit of the number of recommendation devices recommended by recommendation information to a predetermined number.

(2-6) In Step S21 (FIG. 8), the output part 104 may accept an input of information (hereinafter, output requiring information) that the user requires an output of the recommendation information. The output part 104 may determine that the certain time has come when accepting the output requiring information.

This configuration can be achieved, for example, as follows. The user terminal 30 transmits output requiring information to the server 10 in the case that the user performs a certain operation of inputting the output requiring information. The output part 104 accepts the output requiring information and determines that the certain time has come, when the communication circuit 120 receives the output requiring information.

In this configuration, the user can grasp the recommendation information immediately by performing a certain operation of inputting output requiring information at an intended time through the user terminal 30.

In this regard, the output requiring information may include information on the upper limit of the number and the order of recommendation of the recommendation devices recommended by the recommendation information. In Step S22 (FIG. 8), the output part 104 may accordingly include in the recommendation information according to the upper limit and the order of recommendation included in the output requiring information, information that restricts the number of a group of recommendation devices recommended by the recommendation information to the upper limit or less and indicates the order in which each in the group of recommendation devices is displayed or notified by sound. In this case, the user terminal 30 that has received the recommendation information output in Step S23 (FIG. 8) may display or output by sound information concerning recommendation of each of the group of recommendation devices in the order indicated by the recommendation information.

(3) As shown in (3-1) to (3-2) below, the output part 104 may acquire information (hereinafter, recommendation relevant information) to be output together with the recommendation information in Step S22 (FIG. 8), and output the recommendation relevant information together with the recommendation information in Step S23 (FIG. 8).

(3-1) In Step S22 (FIG. 8), after the generation of the recommendation information, the output part 104 may acquire information indicative of a group of functions that are recommendation objects of each of the group of recommendation devices recommended by the recommendation information as the recommendation relevant information.

This configuration can be achieved, for example, as follows. After the generation of the recommendation information by the methods shown in the embodiment and the modifications in (2-1) to (2-6) above, the output part 104 refers to the device management information 421 and the distinctive function information 423 included in the second information (FIG. 3). The output part 104 acquires information indicative of a group of distinctive functions that each of the group of the recommendation devices recommended by the recommendation information has, as information indicative of a group of functions that are recommendation objects of each of the group of recommendation devices, and regards this information as the recommendation relevant information.

In this regard, the output part 104 may refer to the user information 411 included in the first information (FIG. 2) and the useful function information 424 included in the second information (FIG. 3). The output part 104 may then acquire information indicative of a group of useful functions which each of the group of recommendation devices recommended by the recommendation information has and which are useful for an attribute of each of the one or more users of the facility 2 employed by the user, as the information indicative of the group of functions that are recommendation objects of each of the group of recommendation devices, and regard this information as the recommendation relevant information.

Alternatively, similarly to the distinctive function information 423 (FIG. 3), recommendation function information, which includes the model number information and information indicative of a group of functions (hereinafter, recommendation function group) that are in the group of functions of the device 20 with the model number indicated by the model number information and are executed when the device 20 is recommended, may be stored in the second DB 42 beforehand. The recommendation function group includes, for example, a function of turning on or blinking an LED of the device 20.

In Step S22 (FIG. 8), after the generation of the recommendation information by the methods shown in the embodiment and the modifications in (2-1) to (2-6) above, the output part 104 may accordingly refer to the device management information 421 included in the second information (FIG. 3) and the recommendation function information. The output part 104 may then acquire information indicative of the recommendation function group of each of the group of recommendation devices recommended by the recommendation information, as the information indicative of the group of functions that are recommendation objects of each of the group of recommendation devices, and regard this information as the recommendation relevant information.

In this configuration, in Step S23 (FIG. 8), the output part 104 transmits the recommendation relevant information together with the recommendation information to the address indicated by the address information included in the user information 411 (FIG. 2). In this regard, the output part 104 may further transmit a control command for ordering execution of the group of functions that are recommendation objects and indicated by the recommendation relevant information to each of the group of recommendation devices recommended by the recommendation information.

In this configuration, information concerning recommendation of a group of functions that are recommendation objects of each of the group of recommendation devices recommended by the recommendation information is output together with the recommendation information. This can motivate the user to use the group of functions that are the recommendation objects of each of the group of recommendation devices recommended by the recommendation information.

(3-2) In Step S22 (FIG. 8), after the generation of the recommendation information, the output part 104 may acquire information indicative of a group of relevant products relevant to each of the group of recommendation devices recommended by the recommendation information as the recommendation relevant information.

This configuration can be achieved, for example, as follows. After the generation of the recommendation information by the methods shown in the embodiment and the modifications in (2-1) to (2-6) above, the output part 104 refers to the device management information 421 and the relevant product information 425 included in the second information (FIG. 3). The output part 104 then acquires the relevant product information 425 on each of the group of recommendation devices recommended by the recommendation information as information indicative of a group of relevant products relevant to each of the group of recommendation devices, and regards this information as the recommendation relevant information.

In Step S23 (FIG. 8), the output part 104 transmits the recommendation relevant information together with the recommendation information to the address indicated by the address information included in the user information 411 (FIG. 2).

In this configuration, the relevant product information 425 on each of the group of recommendation devices recommended by the recommendation information is output together with the recommendation information. Thus, not only the group of recommendation devices recommended by the recommendation information but also the group of relevant products relevant to each of the group of recommendation devices can be recommended to the user.

(4) The processor 100 may further serve as a management part 105 shown by a rectangle in a broken line in FIG. 5 that stores information on at least one of use and purchase by the user of each recommendation device in the group of recommendation devices recommended by the recommendation information output by the output part 104.

This configuration can be achieved, for example, as follows. The management part 105 periodically executes the following process. The management part 105 refers to the recommendation history information 112 stored in the memory 110 (FIG. 6), the first information (FIG. 2) stored in the first DB 41, the second information (FIG. 3) stored in the second DB 42, and the log information 431 and the movement history information 433 (FIG. 4) stored in the log DB 43.

The management part 105 then recognizes the operational state of the group of recommendation devices at a time when the user is present at an installation position of the group of recommendation devices recommended by the recommendation information and after the recommendation date and time of the output of the recommendation information. In the case that one recommendation device in the group of recommendation devices is indicated to be in the operational state of in use, the management part 105 determines that the user uses the one recommendation device recommended by the recommendation information. The management part 105 thus recognizes the number of times of use by the user of each of the group of recommendation devices recommended by the recommendation information output by the output part 104. The management part 105 then stores in the memory 110 recommendation device use information including the user ID, the device ID and the number of times of use of the recommendation device used by the user, and the recommendation information concerning recommendation of the recommendation device in association with each other, as information on the use by the user of the recommendation device.

In the case that a device 20 with the same model number as the model number of the first device 20 is included in a group of recommendation devices recommended by recommendation information output before the usage period of the first device 20, the management part 105 determines that the user has purchased the device 20 with the same model number as the model number of the first device 20 recommended by the recommendation information. In this case, the management part 105 stores in the memory 110 recommendation device purchase information including the user ID, the device ID of the device 20 with the same model number as the model number of the first device 20, and the recommendation information in association with each other, as information on purchase by the user of the device 20 with the same model number as the model number of the first device 20.

In this regard, the management part 105 may not store the recommendation device use information or the recommendation device purchase information in the memory 110.

In this configuration, a reference to at least one of the recommendation device use information and the recommendation device purchase information stored in the memory 110 enables a grasp of information on at least one of use and purchase by the user of each recommendation device in the group of recommendation devices recommended by the recommendation information. Thus, the influence on at least one of use and purchase by the user of a device 20 that is exerted by the recommendation of the recommendation devices by the recommendation information can be grasped.

Accordingly, the manufacturer of the recommendation device can, for example, give money back to the management company of the facility 2 where the recommendation device is installed, according to the number of times of use of the recommendation device or the number of purchases of the recommendation device by the user.

(5) The processor 100 may further serve as a sales promotion part 106 shown by a rectangle in a broken line in FIG. 5 that outputs information on purchase of one recommendation device in the group of recommendation devices recommended by the recommendation information output by the output part 104 when detecting that the user uses the one recommendation device.

This configuration can be achieved, for example, as follows. The specification information 422 (FIG. 4) stored in the second DB 42 further includes purchase relevant information on purchase of a device 20 with a model number indicated by the model number information. The purchase relevant information is, for example, a URL indicative of a webpage that shows how to purchase the device 20 or a URL indicative of a webpage that allows an action of purchasing the device 20.

The sales promotion part 106 periodically executes the following process. The sales promotion part 106 refers to the recommendation history information 112 stored in the memory 110 (FIG. 6), the first information (FIG. 2) stored in the first DB 41, the second information (FIG. 3) stored in the second DB 42, and the log information 431 and the movement history information 433 (FIG. 4) stored in the log DB 43.

The sales promotion part 106 then recognizes the operational state of the group of recommendation devices at a time when the user is present at an installation position of the group of recommendation devices recommended by the recommendation information and after the recommendation date and time of the output of the recommendation information. In the case that one recommendation device in the group of recommendation devices is indicated to be in the operational state of in use, the sales promotion part 106 detects that the user uses the one recommendation device. In this case, the sales promotion part 106 outputs information on purchase of the one recommendation device similarly to Step S23 (FIG. 8).

This configuration can make the user that has used one recommendation device recommended by the recommendation information quickly refer to information on purchase of the one recommendation device. Thus, the purchase intention of the user for the one recommendation device can be increased.

(6) In Step S22 (FIG. 8), the output part 104 may refer to the device management information 421 included in the second information (FIG. 3), and include in the recommendation information the installation position of the group of recommendation devices recommended by the recommendation information and map information indicative of a map of an area covering the installation position of the group of recommendation devices. For example, the output part 104 requires the external device such as the web server 50 to transmit the map information, and acquires the map information sent back from the external device in response to this.

In this case, the user terminal 30 that has received the recommendation information output in Step S23 (FIG. 8) may display the map indicated by the map information included in the recommendation information and display a certain mark on the installation position of the group of recommendation devices recommended by the recommendation information on the map.

(7) In the embodiment and the modifications above, the output part 104 may recognize a time when a specific user is present at the installation position of the first device 20 and a second device 20 by use of the sensor information 432 stored in the log DB 43 (FIG. 4) and the collation-use information 414 included in the first information (FIG. 3).

Specifically, each of the first information (FIG. 2) and the second information (FIG. 3) has not only the device management information 412 (FIG. 2) and the device management information 421 (FIG. 3) on the device 20 installed in the facility 2, but also the device management information 412 and the device management information 421 on the sensor 21 installed in the facility 2.

The output part 104 acquires the sensor information 432 and the movement history information 433 from the log DB 43 (FIG. 4), and refers to the device management information 412 and the collation-use information 414 included in the first information (FIG. 2), the device management information 421 included in the second information (FIG. 3), and the acquired sensor information 432 and movement history information 433. The output part 104 then recognizes that the user, specified on the basis of detection information detected by a sensor 21 installed within a predetermined distance from the first device 20 and the collation-use information 414, is present at the installation position of the first device 20 on the detection date and time of the detection information.

Similarly, the output part 104 recognizes that the user, specified on the basis of detection information detected by a sensor 21 installed within a predetermined distance from a second device 20 and the collation-use information 414, is present at the installation position of the second device 20 on the detection date and time of the detection information.

(8) The data structures of the first DB 41, the second DB 42, the log DB 43, and the memory 110 described above are merely examples, and each may have another data structure. For example, the processor 100 may refer to the specification information 422 included in the second information (FIG. 3) stored in the second DB 42 instead of the specification information 413 included in the first information (FIG. 2) stored in the first DB 41. The specification information 413 may be excluded from the first information (FIG. 2) stored in the first DB 41.

The present disclosure enables recommendation of a group of devices which may replace a device installed in a facility employed by a user and are installed outside the facility to the user, and thus is useful for encouraging a replacement of a device that is hard to install for the user by him/herself and has a long durable life, e.g., a toilet or a bathtub.

The invention claimed is:

1. An information output method, comprising:

acquiring, by a processor, first information on a first device installed in a facility employed by a user;

acquiring, by the processor, second information on a plurality of second devices installed outside the facility, the second information including installation position information indicative of a position at which each of the plurality of second devices is installed outside of the facility;

determining, by the processor, based on the first information and the second information, a plurality of candidate devices to replace the first device among the plurality of second devices;

acquiring, by the processor, from a surveillance camera or a human detection sensor, position information indicative of a position of the user;

determining, by the processor, based on the position information and the installation position information, at least one candidate device, that is installed at a position within a predetermined distance from a current position of the user and included in the plurality of candidate devices, as at least one recommendation device; and outputting, by the processor, recommendation information concerning recommendation of the at least one recommendation device to the user.

2. The information output method according to claim 1, wherein:

the first information includes a manufacturing date of the first device, a usage period of the first device, and a longevity of the first device;

the second information includes a manufacturing date of each of the plurality of second devices; and in the determining of the at least one recommendation device, in a case that a ratio of the usage period of the first device to the longevity of the first device is larger than a predetermined ratio, at least one of the plurality of second devices with the manufacturing date newer than the manufacturing date of the first device is determined among the plurality of second devices as the at least one recommendation device.

3. The information output method according to claim 2, wherein;

the first information concerns a group of functions which the first device has, and an attribute of each of one or more users that employs the facility;

the second information concerns a group of functions which each of the plurality of second devices has, and a group of useful functions which each of the plurality of second devices has and are useful for an attribute of each of the one or more users; and in the determining of the at least one recommendation device, at least one of the plurality of second devices having a function that is included in the group of useful functions is determined among the plurality of second devices as the at least one recommendation device.

4. The information output method according to claim 1, wherein:

the first information concerns a group of functions which the first device has;

the second information concerns a group of functions which each of the plurality of second devices has; and in the determining of the at least one recommendation device, at least one of the plurality of second devices having a function that the first device does not have is determined among the plurality of second devices as the at least one recommendation device.

5. The information output method according to claim 1, wherein;

the first information concerns a group of functions which the first device has;

the second information concerns a group of functions which each of the plurality of second devices has and at least one distinctive function which each of the plurality of second devices has; and in the determining of the at least one recommendation device, at least one of the plurality of second devices having a function that is included in the at least one distinctive function and that the first device does not have is determined among the plurality of second devices as the at least one recommendation device.

6. The information output method according to claim 1, wherein in the determining of the at least one recommendation device, information indicative of a rule that is set based on the first information and the second information is acquired, and the at least one recommendation device is determined among the plurality of second devices according to the rule.

7. The information output method according to claim 1, wherein in the determining of the at least one recommendation device, a setting of a rule by the user based on the first information and the second information is accepted, and the at least one recommendation device is determined among the plurality of second devices according to the rule.

8. The information output method according to claim 1, wherein:

in the outputting of the recommendation information, information indicative of a position of a group of facilities for encouraging a replacement of a device is acquired; and when a current position of the user is detected to be within a predetermined first distance from at least one facility in the group of facilities, information concerning recommendation of the at least one recommendation device that is installed within a predetermined second distance from the at least one facility is output as the recommendation information.

9. The information output method according to claim 1, wherein:

in the outputting of the recommendation information, history information indicative of a history of usage of the first device by the user is acquired; and when, with reference to the history information, use frequency of the first device by the user is detected to vary a certain degree or more during a latest first period than during a second period before the first period, the recommendation information is output.

10. The information output method according to claim 1, wherein in the outputting of the recommendation information, a notification indicating that the user has required an external device to provide information on the at least one recommendation device is accepted, and information concerning recommendation of the at least one recommendation device is output as the recommendation information when the notification is accepted.

11. The information output method according to claim 1, wherein:

in the outputting of the recommendation information, price information indicative of a price of the at least one recommendation device is acquired periodically; and when the at least one recommendation device is detected to involve a reduction of a predetermined rate or more in the price indicated by the price information to the price indicated by previously acquired price information, information concerning recommendation of the at least one recommendation device is output as the recommendation information.

12. The information output method according to claim 1, wherein in the outputting of the recommendation information, the recommendation information is output periodically.

13. The information output method according to claim 1, wherein in the outputting of the recommendation information, an input of requirement information that the user requires an output of the recommendation information is accepted, and the recommendation information is output when the requirement information is accepted.

14. The information output method according to claim 1, wherein in the outputting of the recommendation information, information indicative of a group of functions that are recommendation objects of each of the group of recommendation devices recommended by the recommendation information is acquired, and information concerning recommendation of the group of functions is output together with the recommendation information.

15. The information output method according to claim 1, wherein in the outputting of the recommendation information, information indicative of a group of relevant products relevant to each of the group of recommendation devices recommended by the recommendation information is acquired, and information concerning recommendation of the group of relevant products is output together with the recommendation information.

16. The information output method according to claim 1, wherein:

the first information includes a usage period of the first device;

the second information includes an installation position of each of the plurality of second devices, movement history information indicative of a history of the current position of the user and log information indicative of an operational state of each of the plurality of second devices are acquired; and information on at least one of use or purchase by the user of each recommendation device in the group of recommendation devices recommended by the recommendation information is stored with reference to the first information, the second information, the movement history information, and the log information.

17. The information output method according to claim 1, wherein:

the first information includes a usage period of the first device;

the second information includes information on an installation position and purchase of each of the plurality of second devices;

movement history information indicative of a history of the current position of the user and log information indicative of an operational state of each of the plurality of second devices are acquired; and when, with reference to the first information, the second information, the movement history information, and the log information, the user is detected to use one recommendation device in the group of recommendation devices recommended by the output recommendation information, information on the purchase of the one recommendation device is output.

18. The information output method according to claim 1, further comprising:

transmitting, by the processor, a control command to the at least one recommendation device, wherein the control command causes a light-emitting component of the at least one recommendation device to illuminate or blink.

19. An information output apparatus comprising:

a processor, wherein the processor is configured to:

acquire first information on a first device installed in a facility employed by a user;

acquire second information on a plurality of second devices installed outside the facility, the second information including installation position information indicative of a position at which each of the plurality of second devices is installed outside of the facility;

determine, based on the first information and the second information, a plurality of candidate devices to replace the first device among the plurality of second devices;

acquire, from a surveillance camera or a human detection sensor, position information indicative of a position of the user;

determine, based on the position information and the installation position information, at least one candidate device, that is installed at a position within a predetermined distance from a current position of the user and included in the plurality of candidate devices, as at least one recommendation device; and output recommendation information concerning recommendation of the at least one recommendation device to the user.

20. A non-transitory computer-readable medium having a program stored thereon for causing a computer to:

acquire first information on a first device installed in a facility employed by a user;

acquire second information on a plurality of second devices installed outside the facility, the second information including installation position information indicative of a position at which each of the plurality of second devices is installed outside of the facility;

determine, based on the first information and the second information, a plurality of candidate devices to replace the first device among the plurality of second devices;

acquire, from a surveillance camera or a human detection sensor, position information indicative of a position of the user;

determine, based on the position information and the installation position information, at least one candidate device, that is installed at a position within a predetermined distance from a current position of the user and included in the plurality of candidate devices, as at least one recommendation device; and output recommendation information concerning recommendation of the at least one recommendation device to the user.

* * * * *